United States Patent [19]

DeSaw

[11] 4,443,677

[45] Apr. 17, 1984

[54] INDUCTION WELDING IMPEDER APPARATUS WITH FLUID COOLING

[75] Inventor: Fred A. DeSaw, Columbus, Ohio

[73] Assignee: Bundy Corporation, Detroit, Mich.

[21] Appl. No.: 388,546

[22] Filed: Jun. 15, 1982

Related U.S. Application Data

[63] Continuation of Ser. No. 237,463, Feb. 23, 1981, abandoned.

[51] Int. Cl.³ .............................................. H05B 6/02
[52] U.S. Cl. .............................. 219/8.5; 219/10.49 R; 219/9.5; 219/61.7
[58] Field of Search ................... 219/8.5, 9.5, 10.49 R, 219/59.1, 61.7

[56] References Cited

U.S. PATENT DOCUMENTS

| | | | |
|---|---|---|---|
| 2,645,702 | 7/1953 | Harmon, Jr. | 219/61.7 |
| 3,209,115 | 9/1965 | van Iperen | 219/61.7 |
| 3,270,176 | 8/1966 | O'Neill et al. | 219/8.5 |
| 3,379,853 | 4/1968 | Domizi | 219/8.5 |
| 3,588,427 | 6/1971 | Oppenheimer | 219/61.7 |
| 3,941,087 | 3/1976 | Yazaki | 219/8.5 X |

*Primary Examiner*—B. A. Reynolds
*Assistant Examiner*—Philip H. Leung
*Attorney, Agent, or Firm*—Harness, Dickey & Pierce

[57] ABSTRACT

A return-flow type impeder assembly useful in induction welding of small tubing wherein the impeder is movably disposed within an enclosure member so that the force of liquid coolant flowing through the assembly between the impeder and enclosure maintain same in substantially coaxial relationship without the use of mechanical spacers or the like.

24 Claims, 2 Drawing Figures

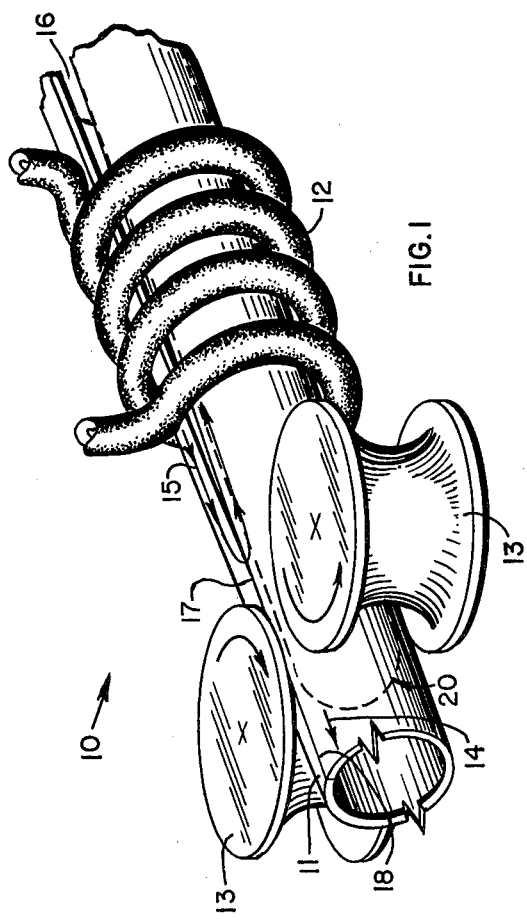
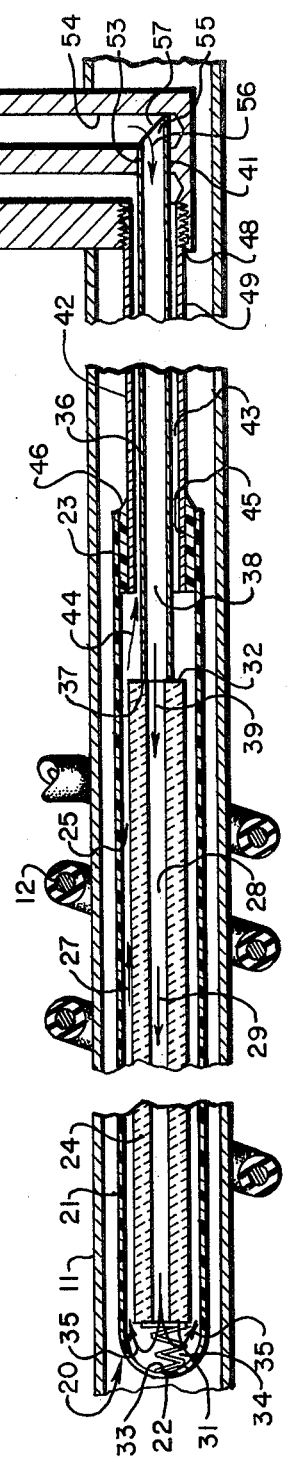
FIG. 1
FIG. 2

INDUCTION WELDING IMPEDER APPARATUS WITH FLUID COOLING

This is a continuation, of application Ser. No. 237,463, filed Feb. 23, 1981, now abandoned.

BACKGROUND AND SUMMARY OF THE INVENTION

This invention relates to impeders for use in induction welding. It is especially useful in the welding of tubing of small inner diameter, where the limited space inside the tubing makes cooling of the impeder difficult.

When high frequency induction welding is used to weld small diameter tube formed from strip, an impeder must be used inside the tube to prevent the current from flowing around the tube and overheating the whole tube. The ferrite rod that impedes the flow of current around the tube is usually cooled by flowthrough water or liquid nitrogen. In some environments, it is not convenient to have water flow through in only one direction, and liquid nitrogen is expensive, so there is a need for return water flow impeders. Such impeders have been made and used successfully heretofore in tubing having inside diameters of three-fourths inch and larger, but not successfully in smaller tubing. The present invention overcomes the problems of frequent breakage, inadequate cooling, etc. that have prevented the successful use of return flow water cooled impeders in the induction welding of tubing having inner diameters in the order of five-eights inch (16 millimeters) and less.

Impeders are provided in radio frequency welding of continuous metal strip to maximize the efficiency and line speed of the operation. The impeder concentrates the magnetic flux field set up by the high frequency induction coil, and thereby impedes the induced eddy current flow in portions of the tubular metal shape in which heating is not desired. By increasing the impedance of such extraneous paths, the impeder causes a concentration of the induced current in those portions of the moving tubular metal where heating is desired for attaining welding temperatures. Therewith, the excess sidewall heating of the tubular metal shape is reduced, and the eddy current flow induced into the tubular formed metal for purposes of heating the edges thereof to welding temperature is caused to flow mainly on the outside surface of the metal and along the edge portions of the tubular formed strip as well as through the apex of the "V" formed by the converging edge portions.

Various metals can be welded at high speeds with the welding apparatus of the present invention. Blackplate, tinplate, and aluminum and aluminum-magnesium alloys, in both light-gauge (0.002–0.004 inch thickness) and heavier gauges, may be welded by lapp or butt welds with increased speeds and decreased power requirements by utilizing the impeder construction of the present invention. Steel has been welded in this range down to 0.002 inch while aluminum has been welded in thicknesses down to 0.004 inch.

Cores of ferromagnetic material have been used as impeders in continuous welding lines. The impeder member presents the problem of difficulty in cooling. The sidewall temperature of the welded material often attains extremely high temperatures, indicating severe power loss. The temperature of the impeder member is only with difficulty maintained below the Curie temperature. Above the Curie temperature the phenomena of ferromagnetism disappear and the impeder substance becomes merely paramagnetic; then acting as if it were not present. Such heating cannot be tolerated in tube welding apparatus.

Impeder members of ferrimagnetic material have been employed in various arrangements for induction coil welding, but because of the limitations, such as overheating and low machinability characteristics, the use of such impeder members has been restricted. A class of such ferrimagnetic material is that termed as ferrites, which are a sintered ceramic mixture of iron oxide and various complex oxides of other metals. Such materials must be of low electrical conductivity, high saturation flux density, and high magnetic permeability; and they should have high thermal conductivity and relatively high Curie temperature.

The impeder of the present invention provides a low reluctance path for the leakage magnetic flux generated by the induction coil. The rapidly alternating flux produces a voltage in the impeder member which causes a current to flow. This induced current produces first, heat in the impeder, and secondly, its own field, which has the effect of distorting the magnetic field of the induction coil, according to Lenz's law. For these reasons it is essential that the impeder members be constructed of a material having low electrical conductivity and high magnetic permeability.

The problems mentioned above become more difficult, and the requirements become more stringent, with smaller tubing. The problem of cooling the impeder adequately is especially difficult for tubing about 16 millimeters and smaller in inside diameter; and the present invention is particularly advantageous in its overcoming of this problem.

Accordingly, it is the primary object of the present invention to provide an improved impeder which is especially useful in induction welding of small diameter tubing on the order of 16 millimeters (I.D.) and less.

It is another object of the present invention to provide an improved return liquid flow impeder adapted to prevent the magnetic impeder member from overheating even in induction welding of small diameter tubing.

In addition, it is an object of the present invention to provide an improved return liquid flow impeder which is generally self-centering under the force of the liquid flow, and contains no spacers in an outer liquid heat exchange passage which would obstruct liquid flow.

It is a further object of the present invention to provide an improved return liquid flow impeder which includes a flexible connection between an enclosure member for the impeder and an outer feed tube for providing a liquid-tight seal and minimizing the possibility of breakage.

Additional objects and advantages of the present invention will become apparent from a reading of the detailed description of the preferred embodiment which makes reference to the following set of drawings.

BRIEF DESCRIPTION OF THE DRAWINGS

FIG. 1 is a simplified perspective view, partly schematic, of typical apparatus for induction welding of small tubing, showing the location therein of an impeder according to the present invention; and FIG. 2 is a longitudinal sectional view of a preferred embodiment of the impeder of the present invention.

DETAILED DESCRIPTION OF THE PREFERRED EMBODIMENT

In FIG. 1, the induction welding apparatus 10 for small tubing 11 includes an induction coil 12 and weld squeeze rolls 13. The tubing 11 is driven forward, as indicated by the arrow, 14, by any suitable means, outside the region shown in FIG. 1. The induction coil 12 receives alternating current at its resonant frequency (typically about 10 to 450 kilohertz) from any suitable high frequency generator (not shown) with a power input typically of about 30 to 90 kilowatts, and induces in the tubing 11 an alternating current at the same frequency. The useful portion of the induced current at a given instant, as indicated schematically by the curved arrow 15, flows forward along the edge of one side of the V-shaped opening (or "vee") 16, across the apex 17 of the vee 16, and back along the edge of the opposite side of the vee 16. Current also flows back across the vee 16, over the region inside the coil predominantly, to complete the circuit. The current 15 across the apex 17 heats the edges pressed together there by the weld squeeze rolls 13 sufficiently to fuse them together. As the tubing 11 continues to move past the squeeze rolls 13 the fused edges gradually cool down and remain welded together to form a fluid-tight seam 18 in the tubing 11. The impeder 20, indicated in FIG. 1 in outline only by the hidden line at 20, functions in the conventional way described in the background section to minimize extraneous current paths that can dissipate energy and cause harmful heating outside the region of the apex 17.

Referring now to FIG. 2, the impeder 20 according to the present invention, useful in induction welding of tubing 11 of small inner diameter, comprises an elongate circular cylindrical enclosure member 21 having a substantially uniform outer diameter of such size as to fit closely but movably inside the tubing 11 to be welded, a substantially uniform inside diameter, closed at one end 22, and open at the other end 23; an elongate circular cylindrical impeder member 24, shorter than the enclosure member 21, having a substantially uniform outer diameter of such size as to fit substantially coaxially inside the enclosure member 21 with space between the enclosure member and the impeder member to provide an outer heat exchange passage 25 large enough for liquid to flow through (as indicated by the arrow 27), a substantially uniform inner diameter of such size as to provide a central heat exchange passage 28 large enough for liquid to flow through (as indicated by the arrow 29), and open at both ends 31, 32, positioned substantially coaxially inside the enclosure member 21 during operation with one end 31 of the impeder member 24 adjacent the closed end 22 of the enclosure member 21; spacing means 33 (typically a compression spring, as shown in FIG. 2) inside the enclosure member 21 between the closed end 22 thereof and the adjacent end 31 of the impeder member 24, of such size and shape as to provide an end space 34 large enough for liquid to flow therethrough between the central heat exchange passage 28 and the outer heat exchange passage 25 (as indicated by the arrows 35); inner tubular means 36 in contact (at one end 37) with the other end 32 of the impeder member 24, having a substantially uniform outer diameter not greater than that of the impeder member 24 and a substantially uniform inner diameter of such size as to provide a central feed passage 38 at least equal in size to the central heat exchange passage 28 in the impeder member 24 and extending substantially coaxially therefrom for liquid to flow therebetween (as indicated by the arrow 39); the inner tubular means 36 being held in position fixedly (as by a tight pressed fit at 41) relative to the enclosure member 21, and the spacing means comprising a compressed elastic member, such as a spring 33, for pressing the impeder member 24 away from the closed end 22 of the enclosure member 21 and into contact at the ends 32, 37 with the inner tubular means 36; outer tubular means 42 having a substantially uniform inner diameter of such size as to fit substantially coaxially around the inner tubular means 36 with space between the inner and outer tubular means 36 and 42 to form an outer feed passage 43 large enough for liquid to flow therethrough (as indicated by the arrow 44), positioned in that manner with one end portion 45 having a substantially uniform outer diameter slightly smaller than the inner diameter of the enclosure member 21 located substantially coaxially within a portion of the open end 23 of the enclosure member 21 extending beyond the impeder member 24, with a liquid-tight flexible connection (typically comprising a flexible bonding agent 46, as shown in FIG. 2) to the enclosure member 21, for liquid to flow between the outer heat exchange passage 25 and the outer feed passage 43 (as indicated by the arrows 27 and 44); and means (typically comprising a liquid conveyor member 47, such as a manifold as shown in FIG. 2) for conveying liquid in through one feed passage 38 or 43 and out through the other feed passage 43 or 38.

Typically the flexible connection comprises a flexible bonding agent 46 (such as silicone rubber), in the annular space between the inner surface at the open end 23 of the enclosure member 21 and the adjacent outer surface of the outer tubular means 42 in the overlapping region 45 within, over a substantial area of each adjacent overlapping surface, and firmly adhering to each surface.

The annular space 25 between the enclosure member 21 and the impeder member 24 preferably is unobstructed; with the force of the liquid flowing in one direction (as at 39) between the central feed passage 38 and the central heat exchange passage 28, and in the opposite direction (as at 27 and 44) between the outer heat exchange passage 25 and the outer feed passage 43, during operation, positioning the impeder member 24 substantially coaxially within the enclosure member 21, despite any opposing forces, such as gravity, that may also be present. Spacers could be placed between the enclosure 21 and the impeder member 24 to keep them substantially coaxial when the apparatus is not in operation, but they preferably are not used as they would increase the energy requirement for providing the necessary rate of flow of the cooling liquid. Spacers are not needed, because the flow of liquid quickly raises the impeder means 24 into its desired coaxial position when operation of the cooling system begins. A circular groove can be provided in the end 32 of the impeder member 24, if desired, for the end 37 of the inner tubular means 36 to seat in. Such an arrangement assures a steady nonleaking junction of the adjacent ends 32 and 37, but is not essential to satisfactory operation.

Typically the liquid for cooling flows in through one feed passage 38 or 43, continues to flow in through the heat exchange passage 28 or 25 connecting therewith, then flows through the end space 34 between the closed end 22 of the enclosure member 21 and the adjacent end 31 of the impeder member 24 to the other heat exchange passage 25 or 28, then flows back through that passage, and continues to flow out through the other feed passage 43 or 38. Preferably the liquid for cooling flows in through the central feed passage 38 (as indicated by the arrow 39), continues to flow in through the central heat exchange passage 28 (as indicated by the arrow 29), then flows outward through the end space 34 between the closed end 22 of the enclosure member 21 and the adjacent end 31 of the impeder member 24 (as indicated by the arrows 35) to the outer heat exchange passage 25, then flows back through that passage (as indicated by the arrow 27), and continues to flow out through the outer feed passage 43 (as indicated by the arrow 44). Alternatively the liquid may flow in the opposite direction over the same route, as would be indicated if all of the arrows 44, 27, 35, 29 and 39 were to point in the directions opposite to those shown in FIG. 2. The preferred direction provides much more effective and efficient cooling, however, because the liquid coming in through the central passages 38 and 28 is farther away from the hot tubing 11 (and more shielded from the induced currents therein) than it would be in the outer passages 43 and 25. Thus the liquid is still fairly cool when it reaches the end space 34 at the tip end 22 of the impeder member 24, where the greatest transfer of heat is required.

The impeder 20 is especially advantageous for welding tubing 11 having an inner diameter of less than about 16 millimeters, and the outer diameter of the enclosure member 21 typically is at least about 0.4 millimeter less than the inner diameter of the tubing 11. The cross-sectional area of the passages 38, 28, 25, 43 and of the end space 34 through which the liquid for cooling flows preferably is at least about 10 square millimeters, and the rate at which the liquid for cooling flows through the impeder preferably is at least about 2 liters per minute.

The enclosure member 21 typically comprises quartz, heat resistant glass, or other nonmagnetic, electrically insulative material; the impeder member 24 typically comprises ferrite or other ferromagnetic or ferrimagnetic material; the liquid for cooling typically comprises water, ethylene glycol, both, or other heat conductive material; and the inner and outer tubular means 36 and 42 typically comprise copper, brass, stainless steel, or other nonmagnetic, oxidation resistant material.

A typical liquid conveying means comprises an elongate liquid conveyor member 47 approximately perpendicular to the inner and other tubular means 36 and 42, connected with a liquid-tight connection, such as a threaded connection, at 48 to the extending end 49 of the outer tubular means 42, having a first liquid conveyor passage 51 communicating with the other feed passage 43 and a second liquid conveyor passage 52 communicating with the inner feed passage 38; and the extending end 53 of the inner tubular means 36 typically abuts against the wall 54 of the second liquid conveyor passage 52 and has an opening 55 for the flow of liquid between the second liquid conveyor passage 52 and the inner feed passage 38 (as indicated by the curved arrow 56). Typically the extending end 53 of the inner tubular means 36 is cut at an angle of about 45 degrees (as shown at 57) to provide the opening 55. The liquid conveyor member 47 typically is made of copper, brass, stainless steel, or other oxidation resistant material.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

What is claimed is:

1. An impeder useful in induction welding of tubing of small inner diameter, comprising an elongate circular cylindrical enclosure member having a substantially uniform outer diameter of such size as to fit closely but movably inside a tubing to be welded, a substantially uniform inside diameter, closed at one end, and open at the other end;

an elongate circular cylindrical impeder member, shorter than the enclosure member, having a substantially uniform outer diameter of such size as to fit substantially coaxially inside said enclosure member with space between said enclosure member and said impeder member to provide an outer heat exchange passage large enough for liquid to flow through, a substantially uniform inner diameter of such size as to provide a central heat exchange passage large enough for liquid to flow through, and open at both ends, positioned coaxially inside said enclosure member during operation with one end of said impeder member adjacent said closed end of the enclosure member;

spacing means inside said enclosure member between said closed end thereof and the adjacent end of said impeder member, of such size and shape as to provide an end space large enough for liquid to flow therethrough between said central heat exchange passage and said outer heat exchange passage;

inner tubular means in contact with said other end of said impeder member, having a substantially uniform outer diameter not greater than that of said impeder member and a substantially uniform inner diameter of such size as to provide a central feed passage at least equal in size to said central heat exchange passage in said impeder member and extending substantially coaxially therefrom for liquid to flow therebetween;

said inner tubular means being held in position fixedly relative to the enclosure member, and said spacing means comprising a compressed elastic member for pressing said impeder member away from said closed end of the enclosure member and into contact with said inner tubular means;

outer tubular means having a substantially uniform inner diameter of such size as to fit substantially coaxially around said inner tubular means with space between said inner and outer tubular means to form an outer feed passage large enough for liquid to flow therethrough, positioned in that manner with one end portion having a substantially uniform outer diameter slightly smaller than the inner diameter of said enclosure member located substantially coaxially within a portion of said open end of the enclosure member extending beyond the impeder member, with a liquid-tight flexible connection to said enclosure member, for liquid to flow between said outer heat exchange passage and said outer feed passage; and means for conveying liquid in through one feed passage and out through the other feed passage.

2. The impeder according to claim 1, wherein said spacing means comprises a spring.

3. The impeder according to claim 1, wherein said flexible connection comprises a flexible bonding agent, in an annular space between the inner surface at said open end of said enclosure member and the adjacent outer surface of said outer tubular means in an overlapping region within, over a substantial area of each adjacent overlapping surface, and firmly adhering to each surface.

4. The impeder according to claim 3, wherein said flexible bonding agent comprises silicone rubber.

5. The impeder according to claim 1, wherein said annular space between said enclosure member and said impeder member is unobstructed; with the force of the liquid flowing in one direction between said central feed passage and said central heat exchange passage, and in the opposite direction between said outer heat exchange passage and said outer feed passage, during operation, positioning said impeder member substantially coaxially within said enclosure member, despite any opposing forces such as gravity, that may also be present.

6. The impeder according to claim 1, wherein the liquid for cooling flows in through one feed passage, continues to flow in through the heat exchange passage connecting therewith, then flows through said end space between said closed end of said enclosure member and an adjacent end of said impeder member to said other heat exchange passage, then flows back through that passage, and continues to flow out through the other feed passage.

7. The impeder according to claim 1, wherein the liquid for cooling flows in through said central feed passage, continues to flow in through said central heat exchange passage, then flows outward through said end space between the closed end of said enclosure member and said adjacent end of said impeder member to said outer heat exchange passage, then flows back through that passage, and continues to flow out through said outer feed passage.

8. The impeder according to claim 1, for welding tubing having an inner diameter of less than about 16 millimeters, wherein said outer diameter of said enclosure member is at least about 0.4 millimeter less than said inner diameter of said tubing.

9. The impeder according to claim 1, wherein the cross-sectional area of said passages and end space through which the liquid for cooling flows is at least about 10 square millimeters.

10. The impeder according to claim 1, wherein the rate at which the liquid for cooling flows through said impeder is at least about 2 liters per minute.

11. The impeder according the claim 1, wherein said enclosure member comprises quartz, heat resistant glass, or other nonmagnetic, electrically insulative material.

12. The impeder according to claim 1, wherein said impeder member comprises ferrite or other ferromagnetic or ferrimagnetic material.

13. The impeder according to claim 1, wherein the liquid for cooling comprises water, ethylene glycol, both, or other heat conductive material.

14. The impeder according to claim 1, wherein said inner and outer tubular means comprise copper, brass, stainless steel, or other nonmagnetic, oxidation resistant material.

15. The impeder according to claim 1, wherein the liquid conveying means comprises an elongate liquid conveyor member approximately perpendicular to said inner and outer tubular means, connected with a liquid-tight connection to said extending end of said outer tubular means, having a first liquid conveyor passage communicating with said outer feed passage and a second liquid conveyor passage communicating with said inner feed passage; and wherein said extending end of said tubular means abuts against a wall of said second liquid conveyor passage and has an opening for the flow of liquid between said second liquid conveyor passage and said inner feed passage.

16. The impeder according to claim 15, wherein said extending end of said inner tubular means is cut at an angle of about 45 degrees to provide said opening.

17. An impeder assembly useful in induction welding of small diameter tubing, comprising:
an elongated cylindrical enclosure member adapted to be disposed inside a tube to be welded, having a closed end and an open end;
an elongated cylindrical impeder member disposed inside said enclosure member, configured to provide an outer liquid heat exchange passage between said impeder member and said enclosure member, and a central liquid heat exchange passage communicating therewith, said impeder member having an end supported in a radial direction and another end unsupported in a radial direction;
passage means for conveying cooling liquid into one of said liquid heat exchange passages and out from the other of said liquid heat exchange passages, said passage means including an inner tubular member communicating with said central liquid heat exchange passage and an outer tubular member communicating with said outer liquid heat exchange passage and being substantially coaxially disposed with respect to said inner tubular member; and
support means resiliently attaching said impeder member supported end to said enclosure member and providing for limited movement therebetween whereby the flow of cooling liquid through the assembly causes said impeder member unsupported end to assume a substantially coaxial position with respect to said enclosure member.

18. The impeder according to claim 17, wherein said passage means includes inner tubular means communicating with said central liquid passage and an outer tubular member communicating with said outer liquid passage and being substantially coaxially disposed with respect to said inner tubular means.

19. The impeder according to claim 18, wherein a portion of said outer tubular means extends coaxially within said enclosure member a predetermined distance to provide an overlapping region.

20. The impeder according to claim 17, wherein said enclosure member is comprised of an electrically insulative, nonmagnetic and heat resistant material.

21. The impeder according to claim 17, wherein said impeder member is comprised of a material having low electrical conductivity and high magnetic permeability.

22. The impeder according to claim 17, wherein one end of said impeder member is adjacent to and spaced from said closed end of said enclosure member to thereby define a connecting liquid passage between said outer and central liquid passages.

23. The impeder according to claim 22, further including elastic spacer means disposed in said connecting liquid passage for exerting an axial force on said impeder member away from said closed end of said enclosure member.

24. The impeder according to claim 17, wherein cooling liquid flows in through said central liquid heat exchange passage and out through said outer liquid heat exchange passage.

* * * * *